United States Patent [19]

Forster et al.

[11] Patent Number: 4,980,869
[45] Date of Patent: Dec. 25, 1990

[54] MONITOR UNIT FOR SENSORS, PARTICULARLY ULTRASONIC SENSORS, FOR MOTOR VEHICLE BACKUP MONITORING

[75] Inventors: Alfred Forster, Schwandorf; Rudolf Zimmermann, Sulzbach-Rosenberg, both of Fed. Rep. of Germany

[73] Assignee: Siemens Aktiengesellschaft, Berlin & Munich, Fed. Rep. of Germany

[21] Appl. No.: 259,966

[22] Filed: Oct. 19, 1988

[30] Foreign Application Priority Data

Oct. 19, 1987 [DE] Fed. Rep. of Germany ....... 3735348

[51] Int. Cl.$^5$ .............................................. G01S 15/93
[52] U.S. Cl. ..................................... 367/99; 367/909; 367/13; 340/904; 73/1 DV
[58] Field of Search .................. 367/902, 99, 909, 13, 367/188; 73/290 V, 1 DV, 1 H; 340/943, 939, 942, 904

[56] References Cited

U.S. PATENT DOCUMENTS

| | | | |
|---|---|---|---|
| 3,394,589 | 7/1968 | Tomioka | 367/902 |
| 3,491,334 | 1/1970 | Martin | 340/904 |
| 3,749,197 | 7/1973 | Deutsch | 180/169 |
| 4,210,969 | 7/1980 | Massa | 367/902 |
| 4,292,679 | 9/1981 | Kondo et al. | 367/188 |
| 4,500,977 | 2/1985 | Gelhard | 367/909 |
| 4,561,064 | 12/1985 | Bruggen et al. | 340/904 |
| 4,578,997 | 4/1986 | Soltz | 73/290 V |
| 4,745,808 | 5/1988 | Hagen | 73/597 |
| 4,803,670 | 2/1989 | Chen | 367/909 |

OTHER PUBLICATIONS

Patent Abstracts of Japan, Band 8, No. 219 Oct. 5, 1984, JP A 59-102173.

*Primary Examiner*—Hezron E. Williams
*Assistant Examiner*—Rose M. Finley
*Attorney, Agent, or Firm*—Kenyon & Kenyon

[57] ABSTRACT

A motor vehicle backup monitor introduces a reflector into the detection range of a sensor in predetermined manner during a test phase. The reflector can comprise, for example, the flap of the housing which encloses the sensor. The reflector is removed from the detection range of the sensor during its operational phase. The monitor unit is particularly applicable to ultrasonic sensors used to monitor a motor vehicle when it is backing up.

17 Claims, 2 Drawing Sheets

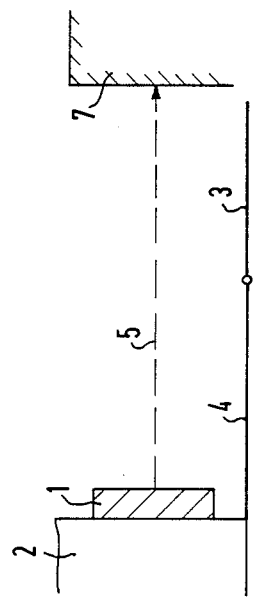
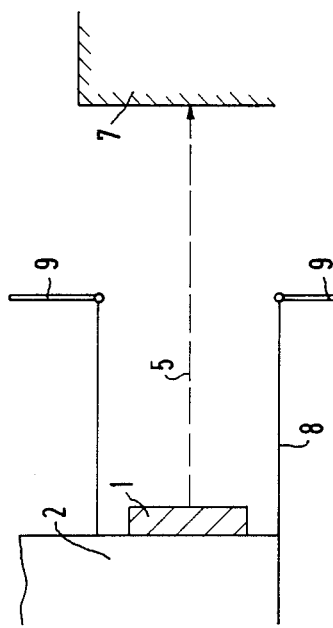
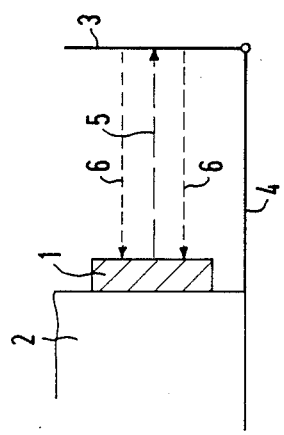
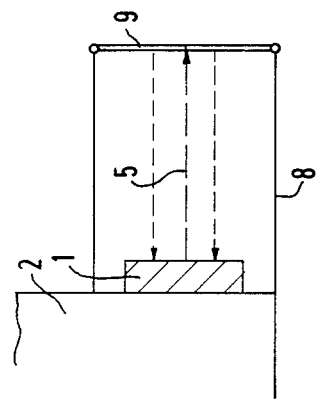

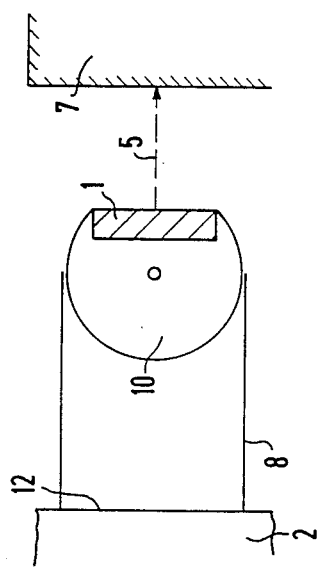
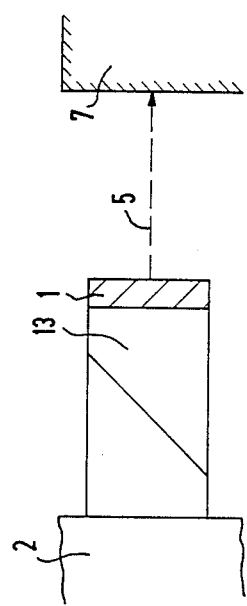
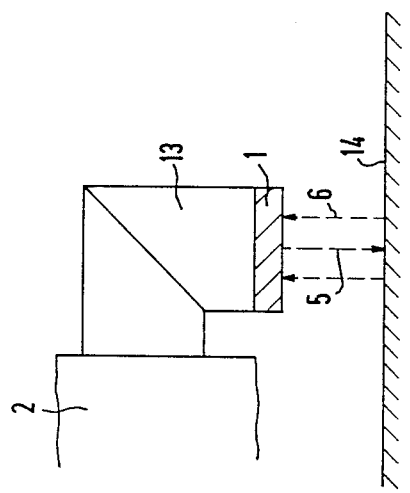
FIG 5
FIG 6
FIG 7
FIG 8

MONITOR UNIT FOR SENSORS, PARTICULARLY ULTRASONIC SENSORS, FOR MOTOR VEHICLE BACKUP MONITORING

BACKGROUND OF THE INVENTION

The present invention relates to a monitor unit for sensors, and particularly ultrasonic sensors for monitoring the backup of a motor vehicle. The sensor has an element for influencing the sensor in a predetermined manner for test purposes.

Such monitoring units are known, for example, from U.S. Pat. No. 4,561,064. This prior patent describes a range measuring device having a transmitter and receiver unit for a measuring signal reflected by the object being measured. A transit time determination detector analyzes the measured signal and generates, upon reaching at least on preset travel time, a predetermined acoustical and/or optical distance signal. The transmitter and receiver unit has a reflector assigned to it at a predetermined distance. The travel time signal received by this reflector drives an acoustical and/or optical function control unit. The range measuring device can operate using ultrasound or infrared light. Active function testing and function display takes place continuously during the operation of the range measuring device.

The foregoing operating mode has several disadvantages. The test object, i.e. the reflector, may hinder the sound transmission. Furthermore, the precise measurement of the range of the object is influenced by multiple reflections from the reflector.

SUMMARY OF THE INVENTION

The present invention relates to a monitoring unit in which the range measurements are not influenced by the, test object. This result is achieved in simple manner by introducing the reflector into the detection range of the sensor for the duration of the test phase. It is possible to exclude the test object by differentiating between the actual operating phase and the test phase. It is advantageous, in the non-operating state, that the reflector of the sensor lies in the detection range, since then the reflector can be automatically swung out of the detection range in response to a signal after activating the sensor. The reflector can be, for example, a pin. In order to protect the sensor against environmental stress, such as dirt or ice on the motor vehicle, and simultaneously retain monitoring capability, it is advantageous to enclose the reflector in a housing flap. These advantages also apply in an embodiment in which the sensor can be swung around so as to use the rear of the housing as the reflector. This last embodiment has the further advantage that no parts need to be laterallY moved beyond the sensor when activating it. To perform the necessary check that the sensor is correctly positioned on a motor vehicle, a further embodiment advantageously has the sensor mounted on the motor vehicle in a way that allows the sensor to swivel toward the roadway and use it as the reflector. Environmental influences are largely prevented from dirtying the sensor when it is mounted in a protective housing when not in its operating phase.

BRIEF DESCRIPTION OF THE DRAWINGS

FIG. 1 shows the test or rest position of a sensor that uses a pin as the reflector;

FIG. 2 shows the operating position of the sensor and reflector shown in FIG. 1;

FIG. 3 shows the test or rest position of an embodiment in which the flaps of the protective housing can swivel and function as the reflector;

FIG. 4 shows the operating position of the sensor and reflectors shown in FIG. 3;

FIGS. 5 and 6 show an embodiment in which the sensor itself can swivel toward the rear wall of the housing;

FIG. 7 shows the test or rest position of an embodiment in which the sensor can swivel toward the road surface and use it is the reflector; and FIG. 8, shows the operating position of the sensor shown in FIG. 7.

SUMMARY OF THE INVENTION

Referring to the Figures, the ultrasonic sensor 1 is fastened on the rear wall 2 of the motor vehicle. A pin 3 is held, for example, in a mounting 4 at a predetermined distance from the ultrasonic sensor so that an echo pulse 5 of pin 3 is reflected back as reflection pulse 6 onto the ultrasonic sensor 1. After the evaluation circuit of the ultrasonic sensor has recognised the functioning pin 3 is swung into the position shown in FIG. 2. Then the echo pulse 5 can be reflected back from, for example, a loading ramp 7 to the backup monitor of the motor vehicle. For example after the backup guard has been switched on, pin 3 can be automatically swung out of the detection range of the sensor as soon as the monitor unit has checked the ability of the sensor to function.

In the embodiment shown in FIG. 3, the sensor 1 is fastened in a housing 8 that is enclosed by a flap 9. In this embodiment the housing is formed in two flap parts so that the echo pulse 5 reflects from the closed flap 9 as previously described. Here, too, the flap can be automatically opened. This embodiment has the advantage that the sensor 1 is located in the housing where it is protected against environmental influences such as dust or icing during the winter. The flap is opened only when needed, i.e., upon activation of the sensor when backing up. The flaps can be motor driven or actuated with compressed air carried in the truck.

In the embodiment shown in FIG. 5, the sensor 1 is mounted on a cylinder 10 which is partially surrounded by housing 8. Cylinder 10 swivels in the direction of arrow 11 so that, in one direction, the sensor points in its test or rest position toward the rear wall 12 of housing 8. FIG. 6 shows another position of cylinder 10 in which sensor 1 transmits the echo pulse 5 in the direction of loading ramp 7.

FIG. 7 shows a mounting 13 for holding the ultrasonic sensor 1. Mounting 13 comprises two parts that join and swivel at an angle of 45° so that sensor 1 can be moved from the position shown in FIG. 7 into that shown in FIG. 8. FIG. 7 represents the test position in which the ultrasonic echo pulse 5 reflects onto sensor 1 from a road surface 14 as reflection pulse 6 to check the functioning of the sensor. If functional, sensor 1 can be swivelled into the position shown in FIG. 8 to monitor the backup of the motor vehicle.

What is claimed is:

1. A monitor unit for an ultrasonic sensor, comprising:
   a sensor having a detection range, an operating phase and a test phase;
   a reflector for reflecting a reflection pulse to the sensor in a predetermined manner during the test phase; and means for positioning the sensor relative to the reflector so that the reflector is in the detection range of the sensor during the test phase and out of the detection range when the sensor is in the operating phase.

2. A monitor unit as claimed in claim 1, wherein the positioning means comprises means for positioning the reflector in the detection range of the sensor when the sensor is not in the operating phase.

3. A monitor unit as claimed in claim 1 wherein the positioning means comprises means for automatically swivelling the reflector out of the detection range in response to a signal after activation of the sensor.

4. A monitor unit as claimed in claim 2 wherein the positioning means comprises means for automatically swivelling the reflector out of the detection range in response to a signal after activation of the sensor.

5. A monitor unit as claimed in claim 1 wherein the reflector comprises a flap of a housing.

6. A monitor unit as claimed in claim 2 wherein the reflector comprises a flap of a housing.

7. A monitor unit as claimed in claim 3 wherein the reflector comprises a flap of a housing.

8. A monitor unit as claimed in claim 4 wherein the reflector comprises a flap of a housing.

9. A monitor unit as claimed in claim 1, wherein:
the positioning means comprises the means for swivelling the sensor; and
the reflector comprises a rear wall of a housing.

10. A monitor unit as claimed in claim 2, wherein:
the positioning means comprises means for swivelling the sensor; and
the reflector comprises a rear wall of a housing.

11. A monitor unit as claimed in claim 3, wherein: the positioning means comprises means for swivelling the sensor; and
the reflector comprises a rear wall of a housing.

12. A monitor unit as claimed in claim 4, wherein:
the positioning means comprises means for swivelling the sensor; and
the reflector comprises a rear wall of housing.

13. A monitor unit as claimed in claim 1, wherein:
the sensor is installed on a motor vehicle which travels over a roadway; and
the positioning means comprises means for swivelling the sensor to point at the roadway so that it functions as the reflector.

14. A monitor unit as claimed in claim 2, wherein:
the sensor is installed on a motor vehicle which travels over a roadway; and
the positioning means comprises means for swivelling the sensor to point at the roadway so that it functions as the reflector.

15. A monitor unit as claimed in claim 3, wherein:
the sensor is installed on a motor vehicle which travels over a roadway; and
the positioning means comprises means for swivelling the sensor to point at the roadway so that it functions as the reflector.

16. A monitor unit as claimed as claim 4, wherein:
the sensor is installed on a motor vehicle which travels over a roadway; and
the positioning means comprises means for swivelling the sensor to point at the roadway so that it functions as the reflector.

17. A monitor unit as stated in claim 1, wherein said positioning means positions the sensor in a protective housing when the sensor is not in the operating phase.

* * * * *